(12) United States Patent
Lamela et al.

(10) Patent No.: US 7,198,121 B2
(45) Date of Patent: Apr. 3, 2007

(54) SKID STEER VEHICLE WITH BELT DRIVE SUSPENSION

(75) Inventors: Anthony J. Lamela, Gilberts, IL (US); Brian E. Felsing, Park Ridge, IL (US); Troy D. Bateman, Plainfield, IL (US)

(73) Assignee: CNH America LLC, New Holland, PA (US)

( * ) Notice: Subject to any disclaimer, the term of this patent is extended or adjusted under 35 U.S.C. 154(b) by 371 days.

(21) Appl. No.: 10/814,323

(22) Filed: Mar. 31, 2004

(65) Prior Publication Data

US 2005/0217905 A1    Oct. 6, 2005

(51) Int. Cl.
B62D 11/04    (2006.01)

(52) U.S. Cl. ...................... 180/6.48; 474/144
(58) Field of Classification Search .......... 180/6.2, 180/6.48, 6.5
See application file for complete search history.

(56) References Cited

U.S. PATENT DOCUMENTS

| 3,635,365 | A | * | 1/1972 | Bauer ........................ 414/715 |
| 4,055,262 | A | * | 10/1977 | Bauer et al. ................ 414/697 |
| 4,168,757 | A | * | 9/1979 | Mather et al. ............. 180/6.48 |
| 4,705,449 | A | * | 11/1987 | Christianson et al. ....... 414/685 |
| 4,962,821 | A | * | 10/1990 | Kim ........................ 180/6.48 |
| 5,964,567 | A | * | 10/1999 | Bamford ................... 414/685 |
| 6,488,110 | B2 | * | 12/2002 | Price ........................ 180/251 |
| 6,663,114 | B2 | * | 12/2003 | Lamela et al. ............. 280/6.15 |
| 6,742,619 | B2 | * | 6/2004 | Farbotnik et al. ........... 180/312 |

* cited by examiner

Primary Examiner—Kevin Hurley
(74) Attorney, Agent, or Firm—Stephen A. Bucchianeri; John William Stader; Michael C. Harms

(57) ABSTRACT

A skid steer vehicle has two drive motors that are connected by belts to spring-mounted front and rear wheels.

23 Claims, 4 Drawing Sheets

SKID STEER VEHICLE WITH BELT DRIVE SUSPENSION

FIELD OF THE INVENTION

The invention relates generally to skid steer vehicles and, more particularly, it relates to belt driven suspensions for such vehicles.

BACKGROUND OF THE INVENTION

Skid steer loaders were first invented about 30 years ago to fill a need for a small, highly maneuverable vehicle that was capable of carrying an implement mounted on loader arms. Skid steer loaders are typically small vehicles, on the order of 10 to 14 feet long that rest on four or more wheels, at least two of which being disposed on each side of the vehicle.

In order to turn these vehicles, the wheels on opposing sides of the skid steer loader are driven at different speeds. This causes the faster moving wheels on one side to advance that side over the ground faster than the other side on slower moving wheels. The effect is to turn the vehicle toward the wheels on the slower moving side. Since the wheels are not turnable with respect to the vehicle, the vehicle turns by skidding slightly, hence the name "skid steer loader."

In the extreme case the wheels on one side of the vehicle not only rotate slower than the wheels on the other side of the vehicle but can turn in the opposite direction. When this mode of operation is selected, the skid steer loader will rotate in place about a vertical and generally stationary rotational axis. This mode of operation requires the greatest amount of wheel skidding and as a consequence creates ruts and wears tires.

This ability to change direction by rotating about an axis within the footprint or perimeter of the loader itself was the primary reason why the skid steer loader achieved its great success.

Steering by skidding does place an extreme strain on the suspension components of the vehicle. For this reason traditional skid steer vehicles have no sprung suspensions. Instead, they have axles mounted directly to the sidewalls of the skid steer vehicle. Their axles are usually fixed with respect to the vehicle's sidewalls and the wheels are bolted on the ends.

In the traditional skid steer vehicle, the wheels on each side of the vehicle are driven by a link belt (e.g. a chain). The belts are contained in one or two chain tanks that are located inside the body of the vehicle. These tanks are typically formed from structural members of the vehicle such as the steel sidewalls of the chassis. These structural members are sealed to create fluid tight tanks that are filled with lubricant. When the belts are driven by hydraulic motors, they run through the lubricant in the tanks.

New skid steer vehicles having sprung suspensions have been devised in recent years, several of them by the inventors of this patent application. These suspensions typically employ gears and shafts.

This use of a gear and shaft arrangement requires significant additional manufacturing cost, due to the need to make custom gears, accurately machine shafts, and accurately locate the shafts with respect to one another.

The use of gears and shafts also increases the unsprung weight of the vehicle and the overall dimensions of the housings in which the gears are mounted.

What is needed, therefore, is a skid steer vehicle having a reduced unsprung weight. What is also needed is a skid steer vehicle having belts coupling the vehicle's drive motors with the driven wheels. What is also needed are vehicle belt drive housings that are configured to internally support drive belts. What is also needed is a belt drive arrangement that accommodates a sprung suspension.

SUMMARY OF THE INVENTION

In accordance with a first aspect of the invention, a skid steer vehicle is provided that has a chassis, an engine mounted on the chassis, left front and right front wheels independently pivotally mounted to the chassis, left rear and right rear wheels independently and pivotally mounted to the chassis, at least two left side drive belts operable coupled to a left side drive motor and to the left front and left rear wheels, at least two right side drive belts operably coupled to a right side drive motor and to the right front and right rear wheels, wherein the left side and right side motors are drivable to skid steer the vehicle.

The belts may be located outside the vehicle chassis. The motors may be mounted inside the chassis. Each motor may drive two sprockets, each of the two sprockets driving another belt, one coupled to the rear wheel and one coupled to the front wheel. The front and rear drive belts may extend the length of a fore and aft extending belt drive housing. The motor may be disposed between the front and rear wheels and have a motor shaft that extends through a sidewall of the vehicle coaxial with the pivot point of a belt drive housing. The motor may be coupled to and drive two adjacent shafts inside the vehicle chassis, and each shaft may extend through the sidewall of the vehicle coaxial with a pivotal axis of the front and rear belt drive housings. The belts may be link belts made of a plurality of links mechanically coupled together, or they may be flexible composite belts having an internal core of load-carrying fibers surrounded by a flexible elastomeric matrix. Each belt may be coupled at one end to a drive shaft extending from the sidewall of the vehicle and at another end to a sprocket coaxial with the rotating wheels it drives.

BRIEF DESCRIPTION OF THE DRAWINGS

The drawings illustrate the best mode presently contemplated for carrying out the invention.

DETAILED DESCRIPTION OF THE INVENTION

Figure 1:
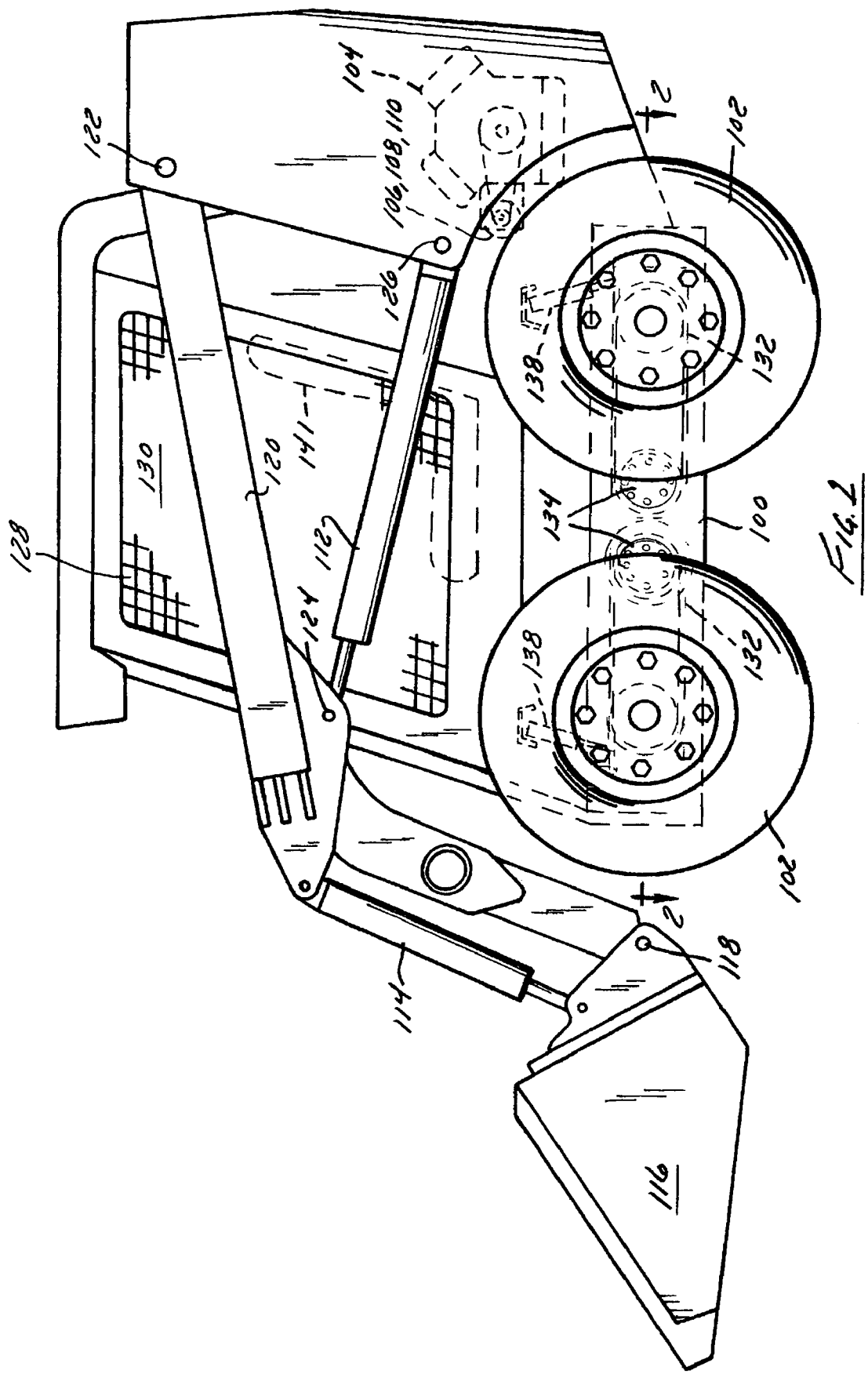
FIG. 1 is a side view of a skid steer vehicle in accordance with the present invention.
Figure 2:
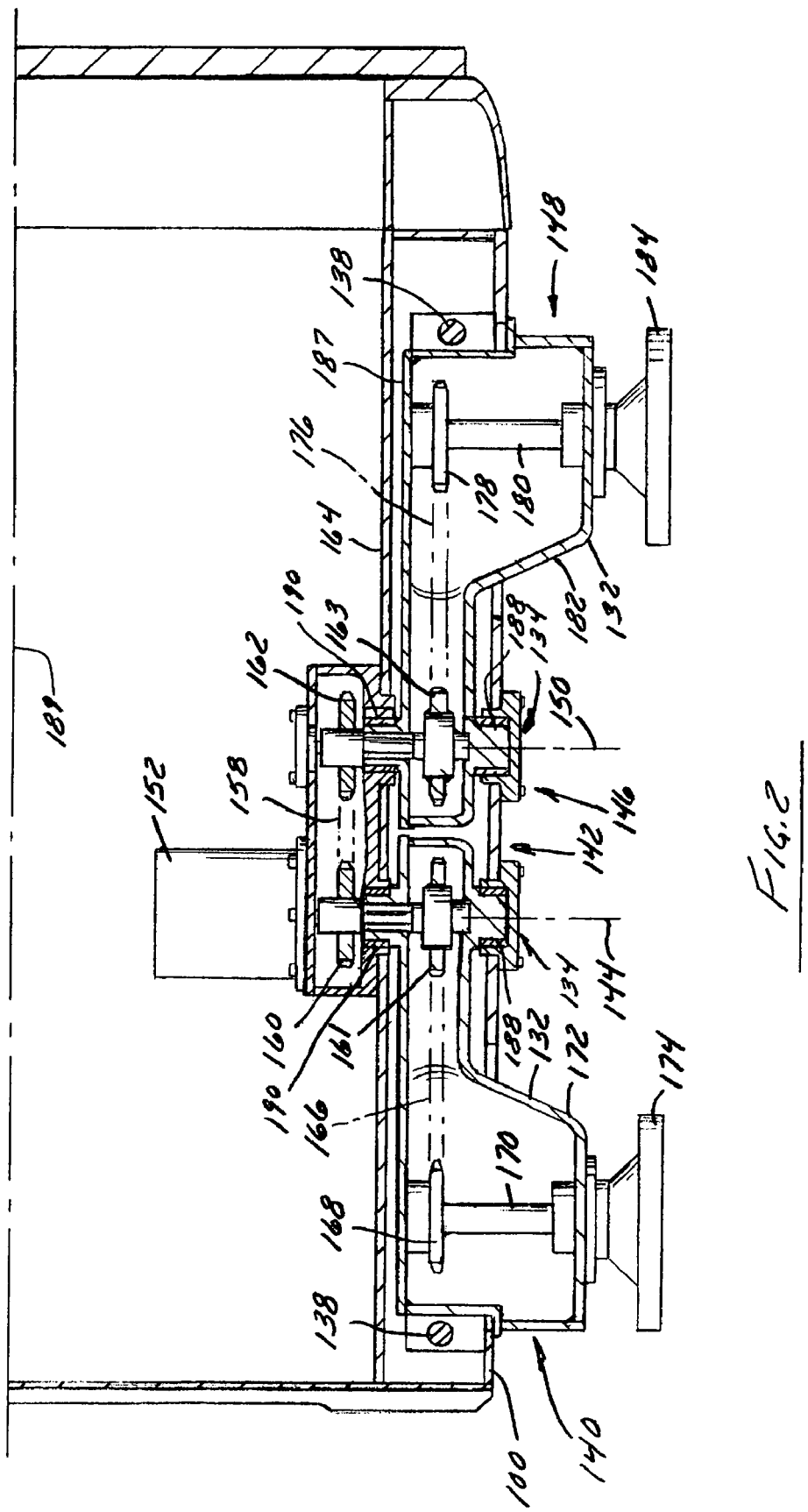
FIG. 2 is a top view of the left side of the skid steer vehicle in partial cross section taken generally along line 2—2 in FIG. 1 and showing the arrangement of the belt drive components.
Figure 3:
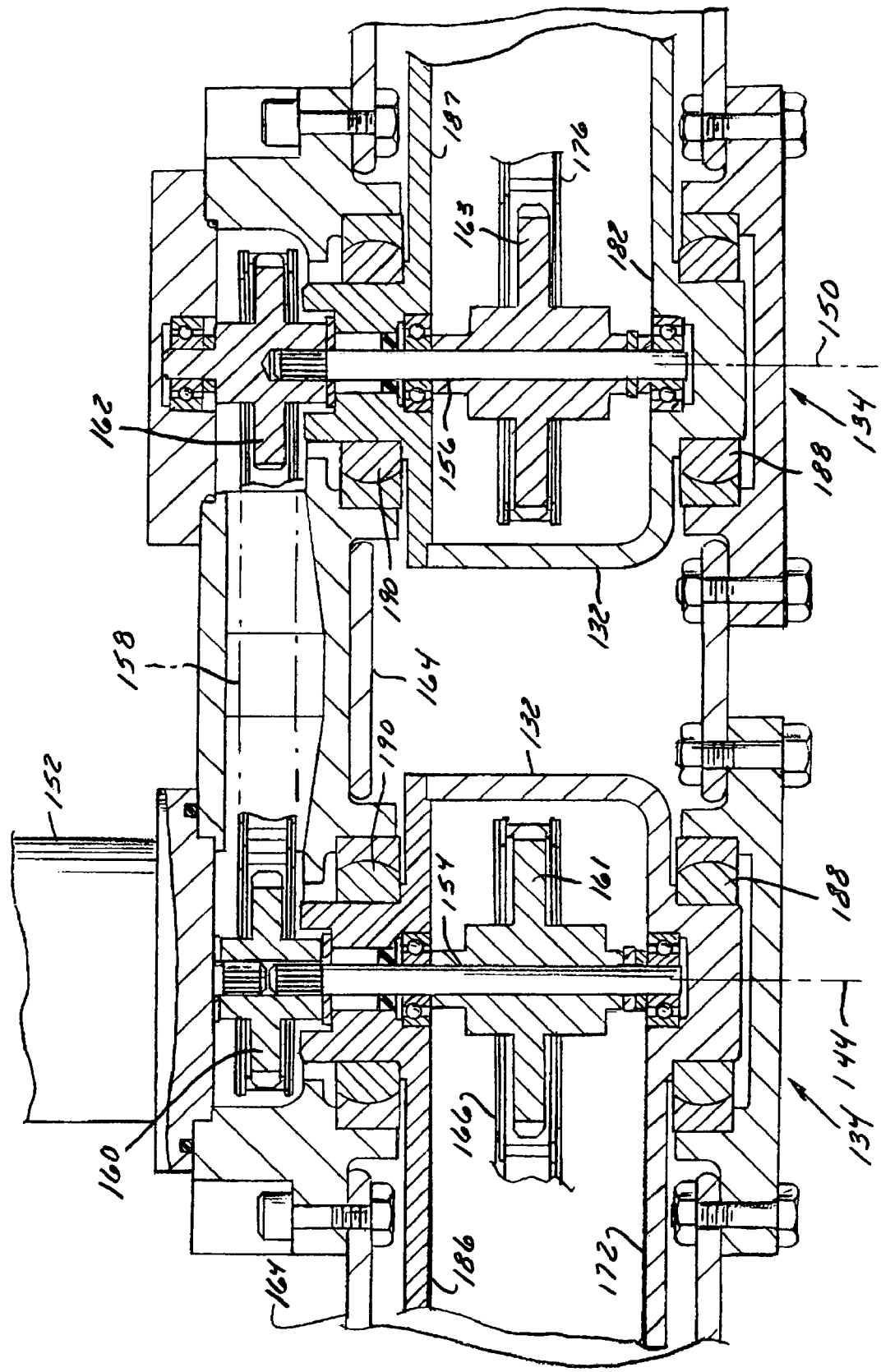
FIG. 3 is a partial fragmentary detail view of the center left side vehicle showing details of the belt drive housings where they are coupled to the chassis. The right side of the vehicle is a mirror of the left side, mirrored about the longitudinal axis of the vehicle.
Figure 4:
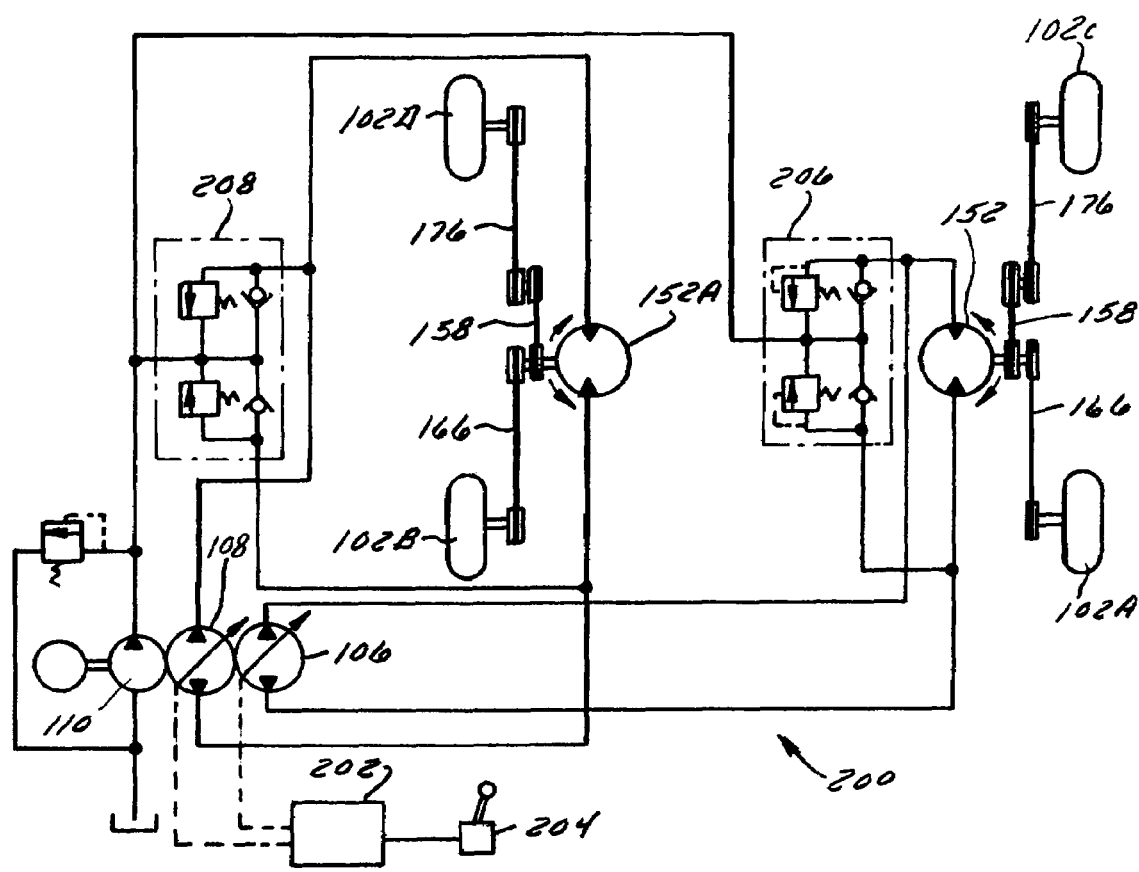
FIG. 4 is a schematic diagram of the hydraulic drive circuit that moves the vehicle over the ground.

Referring now to FIGS. 1–3, the loader includes a chassis or frame 100 to which four wheels 102 are connected, two wheels on each side. An engine 104 is coupled to and drives three hydraulic pumps 106, 108 and 110. Pumps 106 and 108 provide hydraulic fluid to the hydraulic drive motors (FIG. 4) to turn the wheels 102. Hydraulic pump 110 is driven by engine 104 as a charge pump to provide makeup hydraulic fluid to the vehicle's drive motors (FIG. 4). Pumps 106 and 108 are variable displacement bidirectional flow hydraulic pumps.

The lift cylinders 112 are pivotally coupled to and between the chassis and the loader arms 120 to lift the loader arms with respect to the vehicle. Bucket cylinders 114 are coupled to and between the loader arms 120 and a bucket 116 to tilt the bucket with respect to the loader arms. Bucket 116 is pivotally coupled to loader arms 120 at pivot joint 118. It pivots about a substantially horizontal axis with respect to the loader arms when cylinder 114 is retracted or extended. In a similar fashion, loader arms 120 are pivotally coupled to chassis 100 at pivot joints 122 such that the loader arms raise and lower whenever the cylinders 112 extend and retract, respectively. Pivot joints 122 and 126 are located behind the operator seat 141. The lift cylinders 112 are pivotally coupled both to the loader arms and to the chassis at pivot joints 124 and 126, respectively. A heavy duty cage 128 called a ROPS extends about the operator's compartment 130.

Each of the four wheels 102 is rotatably connected to a first end of an associated belt drive housing 132. The opposing end of each belt drive housing is pivotally coupled to the vehicle chassis 100 at a pivot joint 134 which permits the first end to move up and down with respect to the chassis, and permits the housing 132 to pivot with respect to the chassis.

Each belt drive housing 132 is spring mounted and damped by one or more hydraulic cylinders 138 that are coupled at their lower ends to the belt drive housing and at their upper ends to chassis 100. Whenever belt drive housings 132 pivot with respect to chassis 100 at their pivot joints 134, hydraulic cylinders 138 damp the motion of the belt drive housings. These hydraulic cylinders are fluid-filled with hydraulic fluid, gas or a combination of the two. Cylinders 138 may be self-contained or may have external connections to a separate supply of hydraulic fluid and/or gas. The hydraulic cylinders 138 are used as springs to support their associated wheels.

In a preferred embodiment, each hydraulic cylinder 138 includes an internal or external gas-charged accumulator that forces the hydraulic cylinder 138 into an extended position. In this position, the gas charge acts as a spring to support the vehicle on the belt drive housings. This arrangement may supply the total springing for the vehicle, or it may be supplemented (or replaced by) springs disposed elsewhere on the vehicle.

Engine 104 is preferably a two- to six-cylinder internal combustion engine, preferably a diesel engine, and is preferably disposed such that its crankshaft extends parallel to the longitudinal extent of chassis 100.

Pumps 106, 108, and 110 preferably are coupled together in series and to engine 104. In this preferred arrangement, the pump shafts are rotationally coupled to the crankshaft of engine 104.

Two of the belt drive housings 132 are coupled to the vehicle and extend forward to the two front wheels 102. They each have a front end 140 and a rear end 142. They pivot with respect to the chassis about horizontal and lateral pivot axis 144. These two housings 132 extend forward and substantially horizontally, terminating at front wheels 102 to which they are coupled and which they support.

Two of the belt drive housings 132 are coupled to the vehicle and extend backward to the two rear wheels 102. They each have a front end 146 and a rear end 148. They pivot with respect to the chassis about horizontal and lateral pivot axis 150. These two housings 132 extend backward and substantially horizontally, terminating at rear wheels 102 to which they are coupled and which they support.

Each side of the vehicle is equipped with two belt drive housings 132 that support shafts driven by a hydraulic motor. Hydraulic motor 152 is coupled to and drives a first drive shaft 154 coaxial with motor 152. Hydraulic motor 152 also drives a second drive shaft 156 that is parallel to and adjacent to shaft 154.

A belt 158 couples sprockets 160 and 162 that are located on shafts 154,156, respectively. The belt transfers power from motor 152 to shaft 156 thereby permitting motor 152 to drive both shafts 154 and 156 simultaneously.

Shafts 154 and 156 extend through sidewall 164 of the vehicle and extend into forward belt drive housings 132 and rearward belt drive housing 132, respectively. Shafts 154 and 156, in turn, are coupled to and drive front and rear wheels 102, respectively. Motor 152 thereby drives both the front and rear wheels on the left side of the vehicle.

Referring now to the forward belt drive housing, sprocket 161 is mounted on drive shaft 154. A belt 166 is wrapped around and engaged to sprocket 161. Belt 166 extends forward to and wraps sprocket 168 which it drives in rotation. Sprocket 168 in turn is mounted on and drives shaft 170 in rotation. Drive shaft 170 extends through outer wall 172 of the front belt drive housing 132 and is fixed to a flange 174 which it drives in rotation. Front wheel 102 is mounted on and driven by flange 174.

Referring now to the rear belt drive housing, sprocket 163 is mounted on drive shaft 156. A belt 176 is wrapped around and engages with sprocket 163. Belt 176 extends backward to and wraps sprocket 178 which it drives in rotation. Sprocket 178 in turn is mounted on and drives shaft 180 in rotation. Drive shaft 180 extends through outer wall 182 of the rear belt drive housing 132 and is fixed to a flange 184 which it drives in rotation. Rear wheel 102 is mounted on and driven by flange 184.

The forward belt drive housing is made of an outer wall 172 and an inner wall 186 that are fixed together to define an enclosure that is configured to contain its drive belt. The rear belt drive housing is made of an outer wall 182 and an inner wall 187 that are fixed together to define an enclosure that is configured to contain its drive belt. Each belt drive housing 132 is pivotally coupled to the chassis 100 of the vehicle by two spaced-apart spherical bearings 188,190. These bearings constrain the movement of the belt drive housing they are attached to such that housing 132 pivots with respect to the vehicle. The front belt drive housing pivots about axis 144 that is coaxial with belt drive sprockets 160 and 161 and the rear belt drive housing pivots about axis 150 that is coaxial with sprocket 162 and 163. The belt drive housings are configured to keep the length of their respective belts constant as the housings pivot, maintaining a preferred belt tension.

FIGS. 2 and 3 illustrate the belt drive housings of the left side of the vehicle. The right side of the vehicle is identical but in mirror form, mirrored about the longitudinal central axis 189 of the vehicle. Thus the vehicle has two motors, one on each side of the vehicle, each motor driving two belts, one belt disposed in each of a forwardly extending front belt drive housing and a backwardly extending rear belt drive housing. Because the construction of the right side of the vehicle is the same as the construction of the left side of the vehicle, it has been omitted from FIG. 2.

The hydraulic drive system is shown in FIG. 4, which illustrates hydraulic drive circuit 200, the circuit that includes the pumps motors and interconnecting components for driving the wheels 102.

Hydraulic circuit 200 is configured to operate the two hydraulic drive motors 152, which are identified in FIG. 4 as left side drive motor 152, and right side drive motor 152A. The four wheels 102 are identified as left front wheel 102A, right front wheel 102B, left rear wheel 102C and right rear wheel 102D.

Hydraulic drive motor 152 is connected in series with pump 106 to provide a continuous hydraulic fluid flow circuit from pump 106 through motor 152 then back to pump 106 in a first fluid flow direction. The operator can vary the displacement of pump 106 to drive fluid in the opposite fluid flow direction, i.e. pumping fluid from pump 106 in the opposite direction through hydraulic drive motor 152, then back to pump 106. The flow direction and magnitude are controlled electronically by drive controller 202 which is coupled to and controls the displacement of both pumps 106,108 in response to operator manipulation of an operator input device, here shown as joystick 204.

Pump 108 and hydraulic drive motor 152A are identically configured to provide bidirectional fluid flow and are identically controlled by drive controller 202 in response to operator manipulation of joystick 204 to which controller 202 is coupled.

The vehicle therefore has two separately controllable hydraulic drive circuits. One circuit connects pump 106 and hydraulic drive motor 152 to drive wheels 102 on the left side of the vehicle. Another circuit connects pump 108 and hydraulic drive motor 152A to drive wheels 102 on the right side of the vehicle.

Drive controller 202 is coupled to pumps 106 and 108 and is configured to separately and independently vary the speed and rotational direction of the hydraulic drive motors 152, 152A on opposing sides of the vehicle in response to operator commands that joystick 204 is configured to transmit to it. In the preferred embodiment it does this by varying the specific displacement of pumps 106, 108. This drive system is therefore operable to simultaneously drive hydraulic motors on opposing sides of the vehicle in opposite directions and also to simultaneously drive them in the same direction.

The two hydraulic drive circuits that make up drive circuit 200 include two additional circuit elements 206, 208 that are connected in parallel with the pumps 106, 108, respectively. These circuit elements 206, 208 include overpressure relief valves and hydraulic fluid make-up circuits. Relief and makeup circuit 206 is coupled to the drive circuit for the wheels on the left hand side of the vehicle, including pump 106 and hydraulic drive motor 152. Relief and makeup circuit 208 is coupled to the drive circuit for the wheels on the right hand side of the vehicle, including pump 108 and hydraulic drive motors 152A.

Drive controller 202 is preferably a digital drive controller that includes one or more microprocessors or microcontrollers that are coupled together in a network, preferably a CAN bus network in accordance with SAE J1939 to control the devices in the manner described herein. Controller 202 generates signals that it applies to pumps 106 and 108 to control the displacement, flow rate and direction of fluid flow through the pumps.

Joystick 204 preferably provides signals indicative of the displacement of the joystick in two orthogonal directions. It may be a made with variable resistors, potentiometers, rotary shaft encoders, Hall effect devices or similar components.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. The hydraulic system may be manually operated and not electronically operated. For example, in place of the electronic controller and joystick, one or more levers coupled to pumps 106 and 108 may be provided to control the displacement of the pumps.

The invention claimed is:

1. A skid steer vehicle comprising:
   a chassis;
   an engine mounted on the chassis;
   left front and right front wheels independently and pivotally mounted to the chassis;
   left rear and right rear wheels independently and pivotally mounted to the chassis;
   a left side hydraulic drive motor;
   at least two left side drive belts operably coupled to the left side drive motor to drive the left front and left rear wheels;
   a right side hydraulic drive motor; and
   at least two right side drive belts operably coupled to the right side drive motor to drive the right front and right rear wheels;
   wherein the left side and right side motors are controllable to skid steer the vehicle and the left side and right side drive belts are located outside the vehicle chassis.

2. The skid steer vehicle of claim 1, wherein the left side and right side drive motors are mounted inside the chassis.

3. The skid steer vehicle of claim 2, further comprising two left side drive shafts operably coupled to the left side motor and extending through the left sidewall of the vehicle, and two right side drive shafts operably coupled to the right side motor and extending through the right sidewall of the vehicle.

4. The skid steer vehicle of claim 3 wherein one of the two left side drive belts is coupled to one of the left side drive shafts to drive the left front wheel, and wherein the other of the two left side drive belts is coupled to the other of the left side drive shafts to drive the left rear wheel.

5. The skid steer vehicle of claim 4, wherein one of the two right side drive belts is coupled to one of the right side drive shafts to drive the right front wheel, and wherein the other of the two right side drive belts is coupled to the other of the right side drive shafts to drive the right rear wheel.

6. The skid steer vehicle of claim 5, wherein the at least two left side and at least two right side drive belts are disposed inside four separate belt drive housings.

7. The skid steer vehicle of claim 6, wherein the left and right side drive motors are disposed between the front and rear wheels and further wherein shafts of the left and right motors are each coaxial with a pivot axis of a belt drive housing.

8. The skid steer vehicle of claim 7, wherein each of the two left side and two right side drive shafts extends through a sidewall of the vehicle coaxial with a pivot axis of a belt drive housing.

9. The skid steer vehicle of claim 8, wherein the at least two left side and at least two right side drive belts are link belts made of a plurality of links mechanically coupled together.

10. The skid steer vehicle of claim 8, wherein at least two left side and at least two right side drive belts are flexible composite belts having an internal core of load-carrying fibers surrounded by a flexible elastomeric matrix.

11. The skid steer vehicle of claim 8, wherein die at least two left side and at least two right side drive belts are each coupled ad a first end to a drive shaft extending from the sidewall of the vehicle and at a second end to a sprocket coaxial with a drive wheel.

12. A work vehicle comprising:
a frame;
an engine mounted on the frame:
left front and right front wheels spring mounted to the frame;
left rear and right rear drive wheels spring mounted to the frame;
a left side drive motor;
at least two left side drive belts operably coupled to the left side drive motor to drive the left front and left rear wheels;
a right side drive motor; and
at least two right side drive belts operably coupled to die right side drive motor to drive the right front and right rear wheels;
wherein the left side and right side motors are operable to skid steer the vehicle.

13. The skid steer vehicle of claim 12, wherein the at least two left side and right side drive belts are located outside the vehicle chassis.

14. The skid steer vehicle of claim 13, wherein the left and right side drive motors are mounted inside the chassis.

15. The skid steer vehicle of claim 14, further comprising two left side drive shafts operably coupled to rho left side motor, and two right side drive shafts operably coupled to the right side motor.

16. The skid steer vehicle of claim 15, wherein one of the at least two left side drive belts is coupled to one of the left side drive shafts to drive the left front wheel, and wherein another of the at least two left side drive belts is coupled to another of the left side drive shafts to drive the left rear wheel.

17. The skid steer vehicle of claim 16, wherein one of the at least two right side drive belts is coupled to one of time right side drive shafts to drive the right front wheel, and wherein another of the at least two right side drive belts is coupled to another of the right side drive shafts to drive the right rear wheel.

18. The skid steer vehicle of claim 17, wherein the at least two left and at least two right side drive belts are disposed inside belt drive housings.

19. The skid steer vehicle of claim 18, wherein the left and right side drive motors air longitudinally disposed between the front and rear wheels and further wherein shafts of the motors and coaxial with a pivot axis of at least one belt drive housing.

20. The skid steer vehicle of claim 19, wherein each of the two left side and two right side drive shafts extends through a sidewall of the vehicle coaxial with a pivot axis of a belt drive housing.

21. The skid steer vehicle of claim 20, wherein the at least two left side and at least two right side drive belts are link belts made of a plurality of links mechanically coupled together.

22. The skid steer vehicle of claim 20, wherein the at least two left side and at least two right side drive belts are flexible composite belts having an internal core of load-carrying fibers surrounded by a flexible elastomeric matrix.

23. The skid steer vehicle of claim 20, wherein the at least two left side and at least two right side drive belts are coupled at a first end to a drive shaft extending from the sidewall of the vehicle and at a second end to a sprocket coaxial with a drive wheel.

* * * * *